United States Patent Office

3,558,166
Patented Jan. 26, 1971

3,558,166
PRESSURE VESSEL CLOSURE
Donald E. Witkin, Warren, Pa., assignor to National Forge Company, Irvine, Pa., a corporation of Delaware
Filed Aug. 8, 1969, Ser. No. 848,596
Int. Cl. A47j 36/10; B65d 45/00
U.S. Cl. 292—256                                3 Claims

ABSTRACT OF THE DISCLOSURE

A closure for a pressure vessel in which the closure plug fits within the open end of the vessel and in which the vessel walls and closure plug have aligned holes on opposite sides which accommodate tapered closure pins. The closure pins are provided with annular grooves which span the juncture between the vessel and plug. Each closure pin also has a narrow axial groove in its outer surface to accommodate an alignment bar which insures proper pin positioning.

BACKGROUND OF THE INVENTION

The present invention relates to pressure vessels and more particularly to such vessels which are closed by a removable closure plug which fits within an open end of the vessel. When such vessels are subjected to high internal pressures such as are encountered, for example, in vessels used in isostatic pressing systems, the cover plug tends to move slightly relative to the vessel body due to normal deformations which occur under such conditions. The movement of the closure plug against the closure pin has a tendency to raise burrs on the closure pins in the interface region between the vessel and closure plug.

These burrs on the pins preclude removal and re-entry of the pins in subsequent operations without excessive forces or wear on the mating surfaces. The present invention overcomes this problem by providing annular grooves in the closure pins in the region of the junction between the inner vessel wall surface and the surface of the closure plug. Any burs raised upon deformation of the closure pins of the present invention are located within the grooves and do not interfere with the removal or insertion of the closure pins.

SUMMARY OF THE INVENTION

The invention comprises a pressure vessel closure assembly for an open ended hollow pressure vessel in which a closure plug is slidably fitted, and in which the vessel walls and closure plug have aligned holes on opposite sides which accommodate tapered closure pins, the closure pins of the preferred embodiment of the invention being provided with annular grooves which span the juncture between the vessel and plug and axial alignment grooves which accommodate alignment bars affixed to the outer surface of the vessel wall.

BRIEF DESCRIPTION OF THE DRAWING

FIG. 1 is a vertical section view of the vessel, closure plug, and closure pins along the line 1—1 of FIG. 2; and
FIG. 2 is a top plane view of the vessel, closure plug and closure pins of FIG. 1.

DESCRIPTION OF THE PREFERRED EMBODIMENTS

Referring now to the drawing, the assembly shown comprises a pressure vessel 10 having a cylindrical bore 15 which slidably receives a cylindrical closure plug 20. The cylindrical bore 15 has an interior shoulder 16 to serve as a stop for the closure plug 20. The inner edge of the shoulder 16 merges into the reduced cylindrical bore 17 which slidably receives the reduced section 21 of the end of the closure plug 20. The wall 11 of the pressure vessel 10 has diametrically opposite holes 12 and 13 and closure plug 20 has holes 22 and 23 on opposite sides which may be aligned with the holes 12 and 13, respectively.

In the preferred embodiment, the holes 22 and 23 extend to the center axis of the closure plug 20; however, in other embodiments the holes might extend to a lesser distance.

The closure pin 30 is tapered and has a small diameter end 32 and a large diameter end 34. The small diameter end 32 of the closure pin 30 is slidably received within the aligned holes 12 and 22. Both holes 12 and 22 are tapered radially inward to make a close fit with the closure pin 30. Likewise closure pin 31 has a small diameter end 33 and a large diameter end 35. The small diameter end 33 is slidably received within the aligned holes 13 and 23. The holes 13 and 23 are also tapered radially inward to make a close fit with closure pin 31.

Closure pin 30 has an annular groove 36 at the interface between the vessel wall 11 and the closure plug 20. When the vessel is sealed under pressure, the closure plug 20 moves outward and makes deformations or burrs in the surface of the closure pin 30. In ordinary pressure vessel closures of this type, such burrs preclude the removal and re-entry of the pin in subsequent operations without excessive forces or wear on the mating surfaces. Any nicks or burs occurring in the closure pin 30 of the present invention will be within the annular groove 36 which is made deep enough that the nicks or burrs will not interfere with subsequent withdrawal and reinsertion of the closure pin 30. The groove 36 is rounded in order to equally distribute stress formations; however, grooves of other shapes could be used in other embodiments. Likewise, closure pin 31 has a rounded annular groove 37 at the interface of closure plug 20 and the vessel wall 11.

A narrow axial groove 38 is provided in closure pin 30 which receives an alignment bar 18 affixed to the outer surface of the vessel wall 11. This groove 38 extends short of either end of the closure pin 30, and thus serves as both an alignment structure and as a stop for the closure pin. The closure pin 31 has a similar axial alignment groove 39 for receiving an alignment bar 19 affixed to the outer surface of the wall 11. These alignment grooves 38, 39 are desirable because as a practical matter the closure pins 20 and 31 are not machined to be perfectly symmetrical but are made to provide a close fit with the holes 12, 13 in the pressure vessel wall and the holes 22, 23 in the closure plug 20, respectively.

Closure pins 30 and 31 are inserted and withdrawn by means of hydraulic actuator arms 40 and 41, respectively. Likewise closure plug 20 is inserted and withdrawn by means of a hydraulic actuator arm 42.

Typical dimensions of the illustrated embodiment, by way of example only, are the following:

The closure pins 30, 31 are 18 inches long, are 13.787 inches in diameter at the widest ends 34, 35, 13.041 inches in diameter at the smallest ends 32, 33 and have a taper of one degree, 11 minutes, and 38 seconds; the annular grooves 36, 37 being 0.010 inch deep at the greatest depth and the axial grooves 38, 39 being one inch deep at the maximum depth and ½ inch wide.

The closure plug 20 has a diameter of 27.8 inches at the widest section, a diameter of 26.8 inches at the reduced section 21, and a length of 24.25 inches.

The pressure vessel 10 has an outside diameter of 35 inches and an inside diameter at the bore 15 of 27.8 inches and at the reduced bore 17 of 26.8 inches.

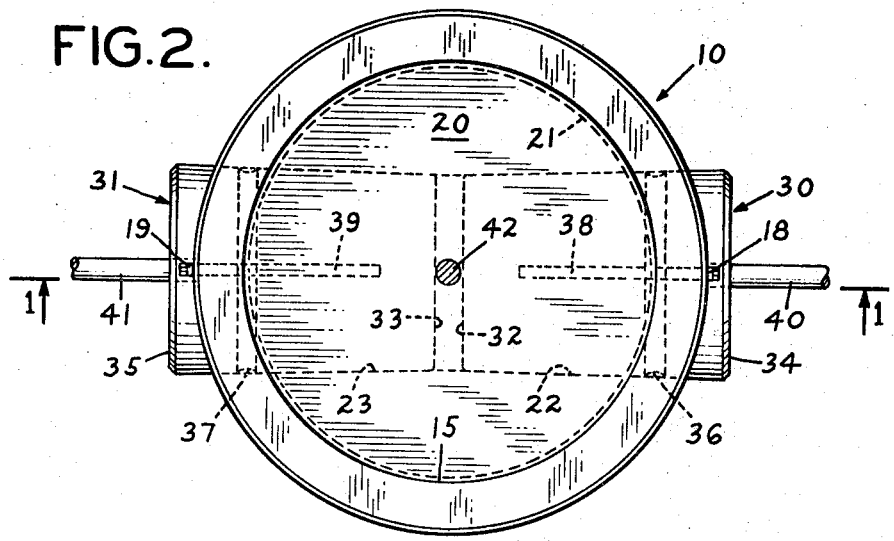
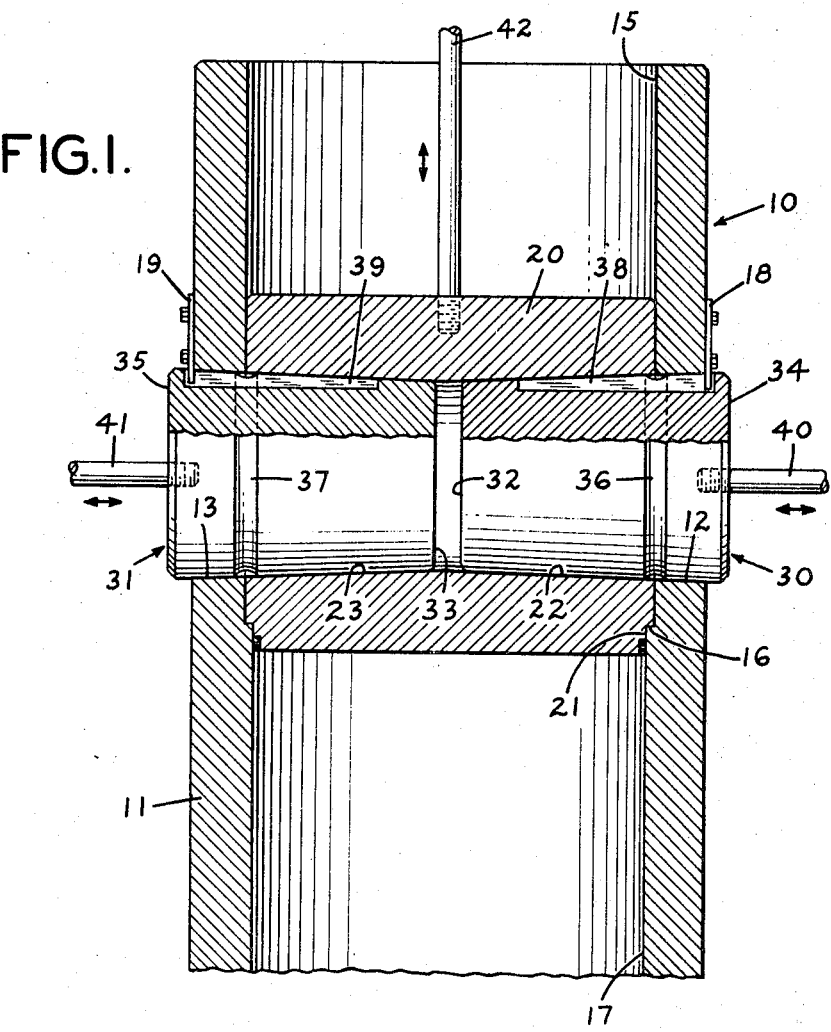

The terms and expressions which have been employed here are used as terms of description and not of limitation, and there is no intention, in the use of such terms and expressions, of excluding equivalents of the features shown and described, or portions thereof, it being recog-